(12) United States Patent
Kang

(10) Patent No.: US 6,574,846 B1
(45) Date of Patent: Jun. 10, 2003

(54) TOOL SET FOR REPLACING BRAKE PADS OF DISC BRAKING SYSTEMS

(76) Inventor: Hsin Fa Kang, No. 44, Alley 50, Lane 143, Kai-Nan Street, Tainan City (TW)

( * ) Notice: Subject to any disclaimer, the term of this patent is extended or adjusted under 35 U.S.C. 154(b) by 0 days.

(21) Appl. No.: 09/969,756

(22) Filed: Oct. 4, 2001

(51) Int. Cl.[7] ............................................... B23P 19/04
(52) U.S. Cl. .............................. 29/239; 29/266; 29/256
(58) Field of Search ........................... 29/239, 266, 258, 29/259, 260, 263, 264, 256, 269, 270, 426.6

(56) References Cited

U.S. PATENT DOCUMENTS

| | | | | |
|---|---|---|---|---|
| 4,809,567 A | * | 3/1989 | Bongard | 81/485 |
| 5,003,681 A | * | 4/1991 | Schley | 29/239 |
| 5,018,261 A | * | 5/1991 | Markous | 29/239 |
| 6,085,398 A | * | 7/2000 | Arch | 29/239 |
| 6,192,566 B1 | * | 2/2001 | Dunum | 29/239 |
| D457,795 S | * | 5/2002 | Mohammed | D8/51 |

* cited by examiner

Primary Examiner—M. Rachuba
Assistant Examiner—Daniel Shanley

(57) ABSTRACT

A tool set for replacing brake pads of disc braking systems in the present invention includes a screw rod, a sleeve, a first plate body, a second plate body, a guide rod, and at least one connector with various sizes, by which a selective combination of the components described above is capable of providing an automobile with a specialized tool for pressing an outward piston to its initial position for convenient replacing new brake pads when the outward piston is gradually traveled toward old brake pads with a continuous wearing in linings of the old disc brake pads. Moreover, various selective combinations of the components described above are also capable of providing automobiles employed with different types of disc braking systems with variety of suitable specialized tools fitting functional requirements and being convenient in operation.

8 Claims, 10 Drawing Sheets

TOOL SET FOR REPLACING BRAKE PADS OF DISC BRAKING SYSTEMS

BACKGROUND OF THE INVENTION

1. Field of the Invention

This invention relates to a tool set for replacing brake pads of disc braking systems, particularly to one provided with a screw rod, a sleeve, a first plate body, a second plate body, a guide rod, and at least one connector with various sizes, by which a selective combination of the components described above is capable of providing an automobile with a specialized tool for pressing an initial piston to its initial position for convenient replacing new brake pads when the outward piston is automatically traveled toward old brake pads with a continuous wearing in linings of the old brake pads. Moreover, various selective combinations of the components described above are also capable of providing automobiles employed with different types of disc braking systems with variety of suitable specialized tools fitting functional requirements and being convenient in operation, thereby achieving a high use rate and being convenient for storage.

2. Description of the Prior Art

Generally speaking, a braking mechanism for an automobile, referring to FIG. 1, mainly includes a brake disc 10, a caliper 11, a pair of brake pads 12, a cylinder 13 and a piston 14. The brake disc 10 is rotated with a wheel of an automobile. The caliper 11 correspondingly disposed at one end of the brake disc 10 is combined with the pair of brake pads 12 and has the cylinder 13 disposed at one side. The cylinder 13 is provided with a piston 14 therein. When a driver pressed a brake pedal, brake fluid is forced from a master cylinder into the cylinder 13 to push the piston 14 the brake disc 10 to produce braking action to forcedly stop the rotation of the wheel. When the linings 120 of the brake pads 12 are worn too thin under a certain thickness after a period of use, the brake pads 12 are required to be replaced with new ones to maintain a good braking force for securing safety in driving. However, with a continuous wearing to the linings 120 of the brake pads 12, the piston 14 is gradually traveled outward into the caliper 11 to make the space of accommodating the brake pads 12 in the caliper 11 become narrower and narrower. Therefore, it is needed to use a specialized tool to press the outward piston 14 to its initial position when replacing new brake pads 12.

SUMMARY OF THE INVENTION

The main purpose of the invention is to offer a tool set for replacing brake pads of disc braking systems capable of making various selective combinations for automobiles employed with different types of disc braking systems and convenient in operation and for storage within little space.

The main feature of the invention is to provide a tool set for replacing brake pads of disc braking systems including a screw rod, a sleeve, a first plate body, a second plate body, a guide rod, and at least one connector with various sizes, wherein the screw rod has one end combined with a sliding handle and the other end provided with a coupling portion as well as a tapered plane; the sleeve capable of being extended through and screwed by the screw rod has a hollow internal-threaded passage formed therein and a flange formed at one end; the first plate body capable of being extended through by the screw rod has a big-bore hole, a middle-bore screw hole and a small-bore hole orderly arranged from the center of the first plate body to one side of the first plate body; the second plate body capable of being extended through by one end of the second plate body capable of being extended through by one end of the screw rod has a first hole, a second hole and a third hole orderly arranged from the center of the second plate body to one side of the second plate body with their centers respectively aligned with those of the big-bore hole, the middle-bore screw hole and the small-bore hole of the first plate body; the guide rod capable of extending through the small-bore hole of the first plate body as well as the third hole of the second plate body disposed at an outer end of the second plate body has a connecting portion disposed at one end of the guide rod for being fixed to the first plate body; the connector has an insert hole formed in the center capable of being extended through and engaged by the coupling portion of the screw rod as well as at least one projection disposed in a proper position on one surface of the connector for being correspondingly fitted into and engaged with at least one engagement groove located in a front surface of a piston, by which a selective combination of the components described above is capable of providing an automobile with a specialized tool for pressing an outward piston to its initial position for replacing new brake pads when the outward piston is gradually traveled toward old brake pads with a continuous wearing in linings of the old brake pads.

BRIEF DESCRIPTION OF DRAWINGS

This invention will be better understood by referring to the accompanying drawings, wherein.

DETAILED DESCRIPTION OF THE PREFERRED EMBODIMENT

Figure 2:
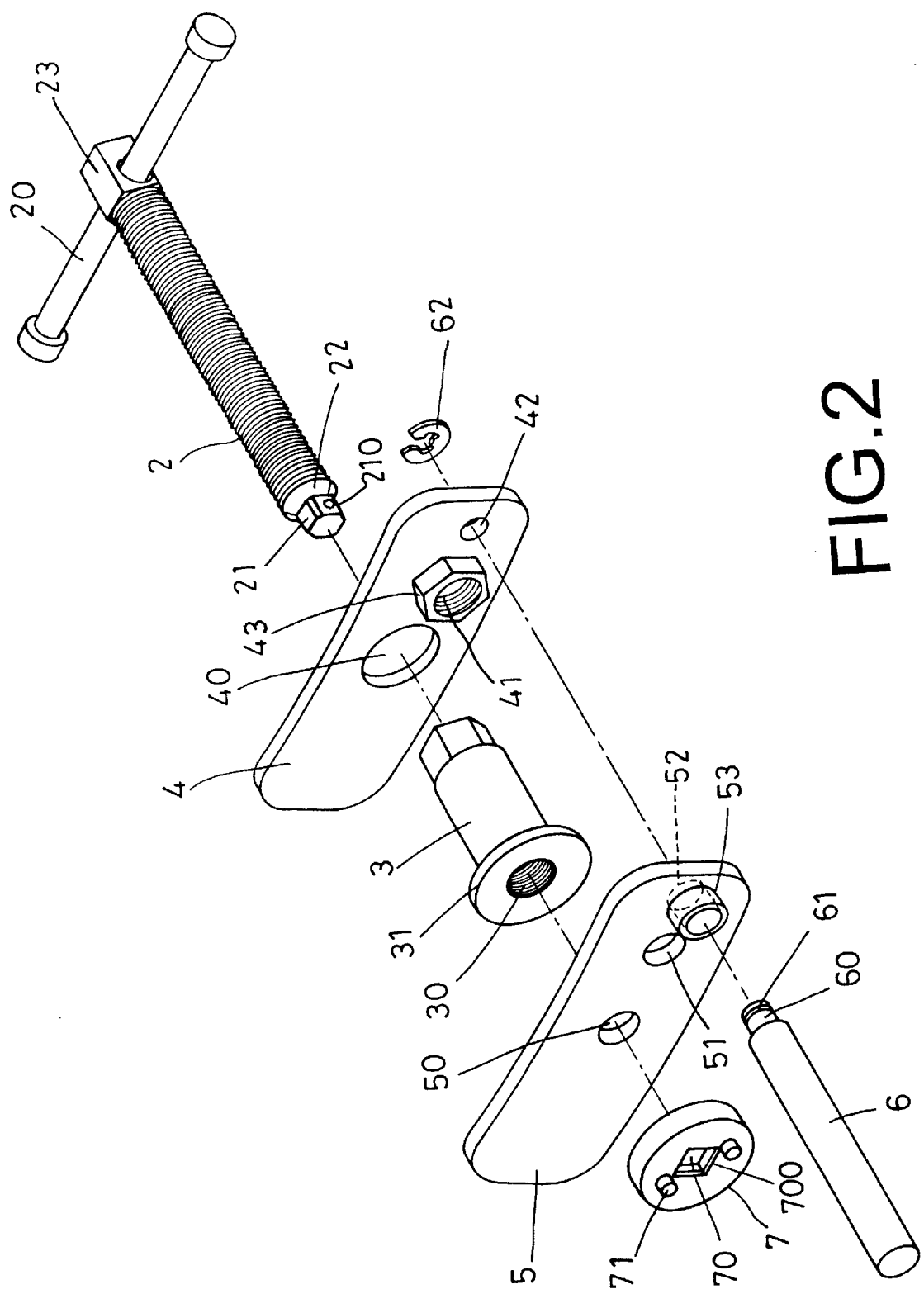
FIG. 2 is an exploded perspective view of a tool set for replacing brake pads of disc braking systems in the present invention, showing all components of the tool set.

A tool set for replacing brake pads of disc braking systems in the present invention, as shown in FIGS. 2, 3 and 4, includes a screw rod 2, a sleeve 3, a first plate body 4, a second plate body 5, a guide rod 6, and at least one connector 7 with various sizes as main components.

The screw rod 2 has one end extended through by a sliding handle 20 and the other end provided with a coupling portion 21 as well as a tapered plane 22. The coupling portion 21 has a ball 210 disposed on one sidewall of the coupling portion 21 and urged by a spring therein for elastic movements. The tapered plane 22 is formed between the coupling portion 21 and the screw rod 2. Moreover, the one of the screw rod 2 that is extended through by the sliding handle 20 is capable of being provided with a polygonal portion 23 for selective operation with a wrench or a socket tool.

The sleeve 3 capable of being extended through and screwed by the screw rod 2 has a hollow internal-threaded passage 30 formed therein and a flange 31 with a larger circumferential plane formed at one end of the sleeve 3.

The first plate body 4 in rectangular shape and capable of being extended through by the screw rod 2 has a big-bore hole 40, a middle-bore screw hole 41 and a small-bore hole 42 orderly arranged from the center of the first plate body 4 to one side of the first plate body 4. Moreover, an internal-threaded nut member 43 with reinforcing function is capable of being firmly welded on one side of the middle-bore screw hole 41 of the first plate body 4.

The second plate body 5 in rectangular shape and capable of being extended through by the tapered plane 22 of the screw rod 2 has a first hole 50, a second hole 51 and a third hole 52 orderly arranged from the center of the second plate body 5 to one side of the second plate body with their centers respectively aligned with those of the big-bore hole 40, the middle-bore screw hole 41 and the small-bore hole 42 of the first plate body 4. Moreover, a hollow stub pipe 53 with reinforcing function is capable of being firmly welded on one side of the third hole 52 of the second plate body 5 being firmly welded on one side of said third hole of said second plate body as an outstretched portion of the third hole of the second plate body and communicated with the third hole 52 of the second plate body 5.

The guide rod 6 capable of extending through the small-bore hole 42 of the first plate body 4 as well as the third hole 52 of the second plate body 5 disposed at an outer end of the second plate body 5 has a connecting portion 60 with smaller diameter disposed at one end of the guide rod 6 and provided with a ring groove 61 for being engaged by a retainer ring 62 so that the connecting portion 60 of the guide rod 6 is capable of being fixed to the first plate body 4.

Figure 4A:
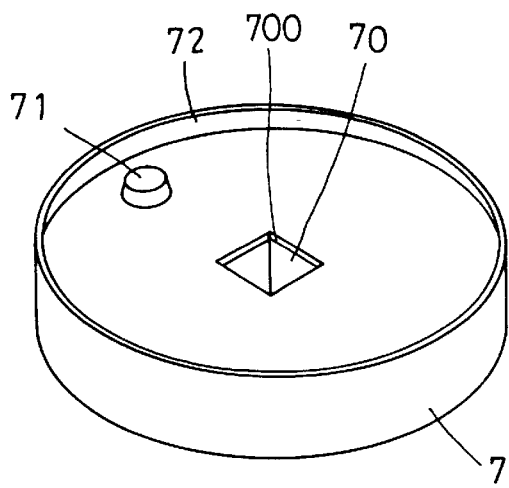
FIGS. 3A, 3B, 3C, 4A, 4B and 4C are perspective views of the tool set for replacing brake pads of disc braking systems in the present invention, showing connectors with various types and sizes.
Figure 3A:
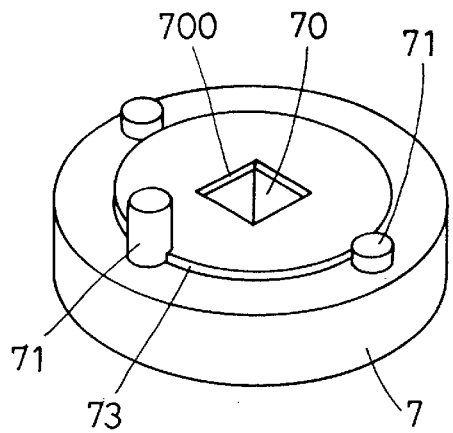
Figure 4B:
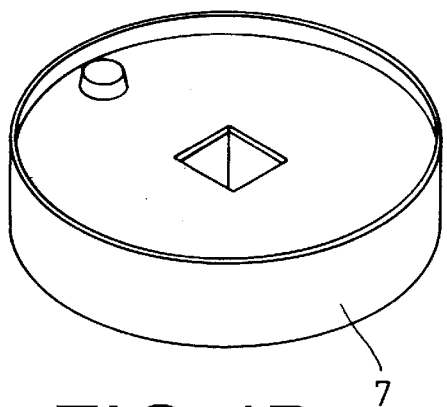
Figure 3B:
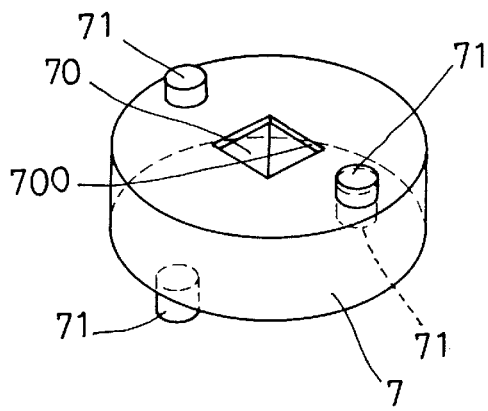
Figure 4C:
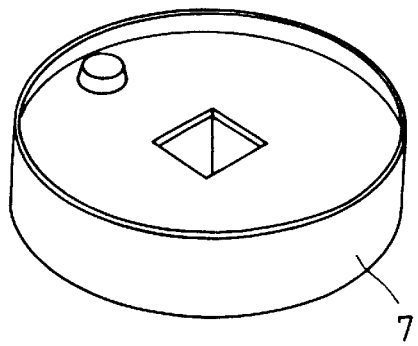
Figure 3C:
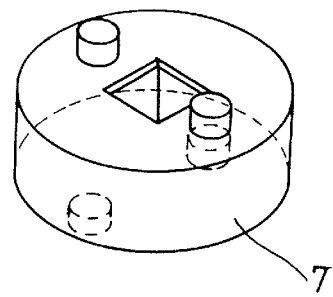

Each of the connectors 7 in discal shape is capable of being provided with various sizes, as shown as in FIGS. 3A, 3B, 3C, 4A, 4B and 4C, and has an insert hole 70 disposed in the center as well as at least one projection 71 protruded on one surface or both surfaces. The insert hole 70 with a chamfered edge 700 is convenient for the smooth inserting of the coupling portion 21 of the screw rod 2. The projections 71 are capable of being disposed in proper positions on both surfaces of the connector 7, as shown in FIGS. 3B and 3C, or only on one surface of the connector 7, as shown in FIGS. 3A, 4A, 4B and 4C, for being correspondingly fitted into and engaged with at least one engagement groove 140 located in a front surface of the piston 14. Moreover, in order to be correspondingly fitted with pistons having various configurations in front surfaces, the connector 7 is capable of being provided with a protective lip 72 protruded around the circumference of connector 7, as shown in FIGS. 4A, 4B and 4C, for being covered on a circumferential edge 141 of the piston 14. The connector 7 is also capable of being provided with a raised face 73 disposed in a central surface of the connector 7, as shown in FIG. 3A. All the connectors 7 as described above are designed to press a kind of spiral-forward piston 14 to its initial position. Because the kind of piston 14 is traveled toward the brake pads 12 in a spiral-forward way, a tight engagement between the connector 7 and the front surface of the piston 14 is capable of having the piston 14 pressed to its initial position under the rotation of the screw rod 2.

Figure 5:
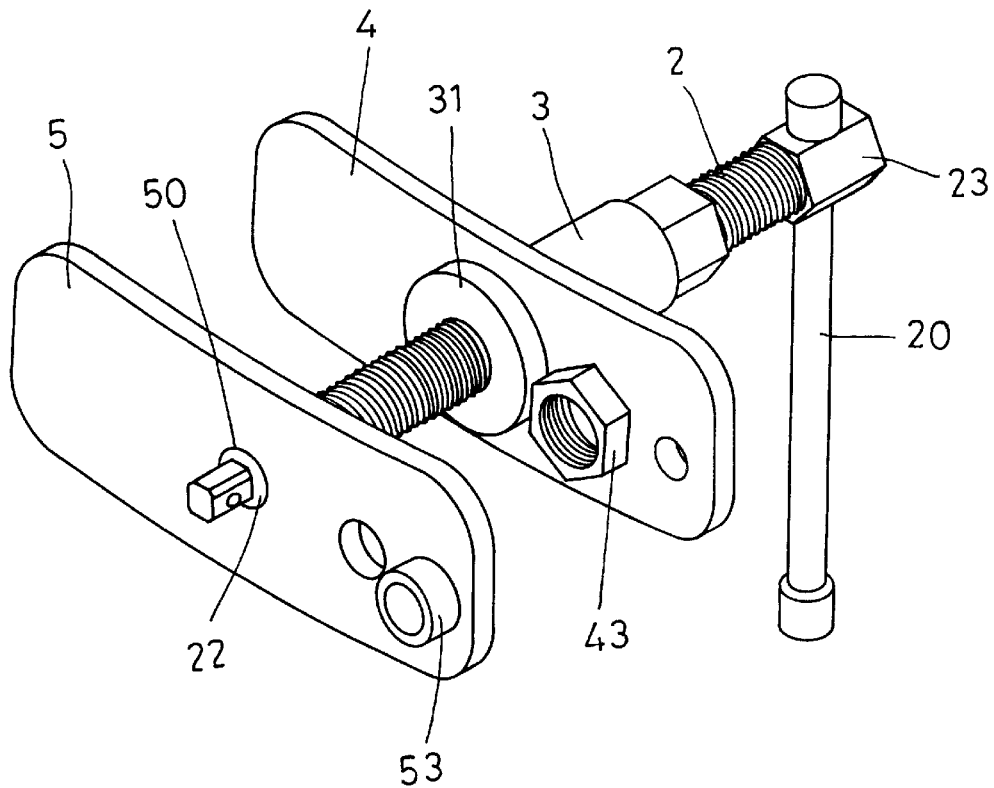
FIG. 5 is a perspective view showing a first preferred embodiment of the tool set for replacing brake pads of disc braking systems in the present invention, showing a first selective combination of the components of the tool set.
Figure 6:
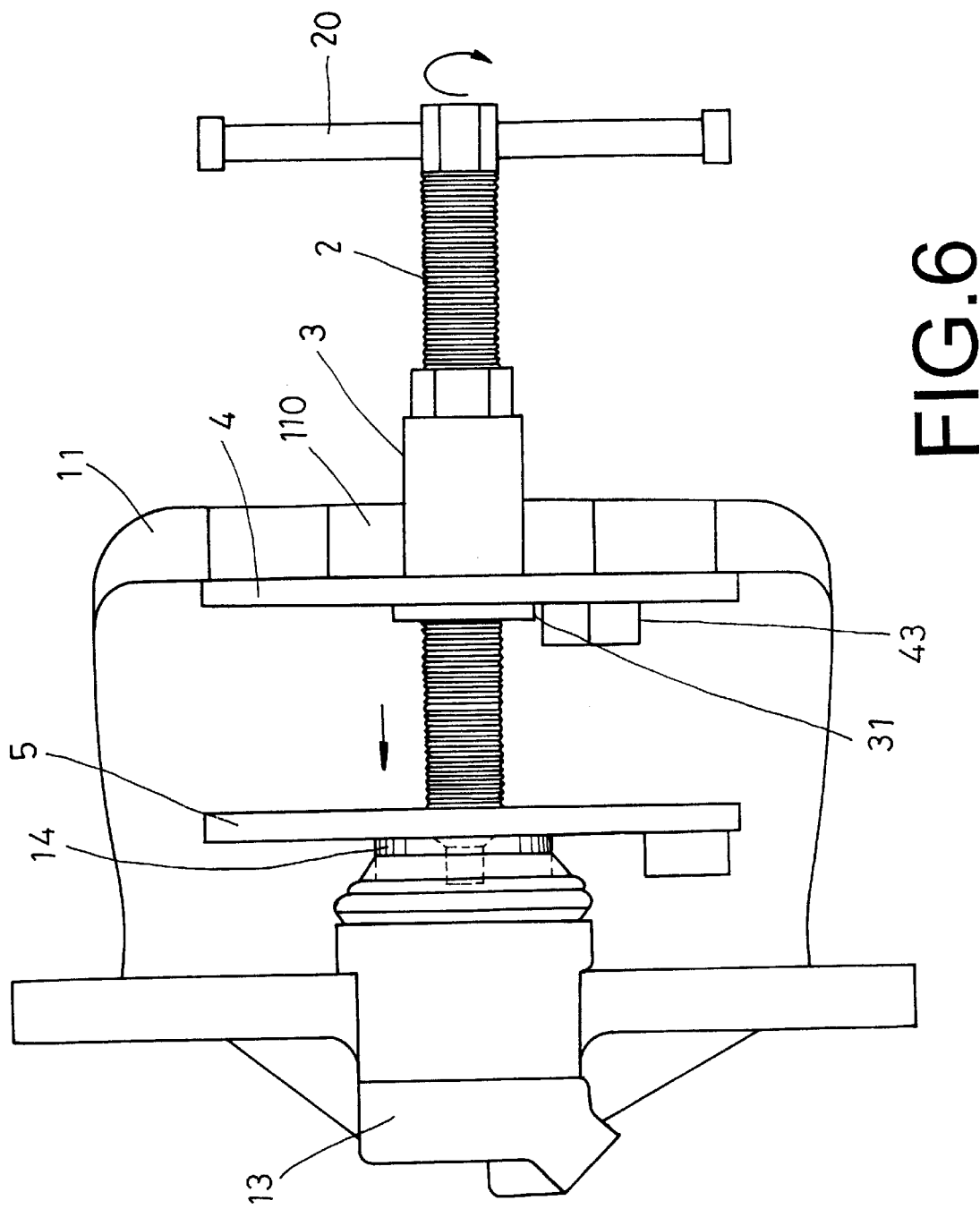
FIG. 6 illustrates from a front view of a caliper, showing the first preferred embodiment of the present invention in operation.

A first preferred embodiment of the tool set for replacing brake pads of disc braking systems in the present invention, as shown in FIGS. 5 and 6, is a first selective combination of components of the tool set used to press a piston 14 that is disposed in a caliper 11 with a central recess 110 to its initial position. In assembling, referring to FIG. 5, firstly extend a rear end of the sleeve 3 through the big-bore hole 40 of the first plate body 4 to have the flange 31 of the sleeve 3 attached against a front surface of the first plate body 4. Secondly, extend the coupling portion 21 of the screw rod 2 through the sleeve 3 from the rear end of the sleeve 3 to have the sleeve 3 screwed with the screw rod 2. Thirdly, extend the coupling portion 21 of the screw rod 2 through the first hole 50 formed in the center of the second plate body 5 to have the second plate body 5 rested against the tapered plane 22 of the screw rod 2, by which a first specialized tool is assembled. In operating, as shown in FIG. 6 illustrating from a front view of the caliper 11, firstly align the screw rod 2 with an axis of the piston 14, contact the second plate body 5 with a front surface of the piston 14 and retain the first plate body 4 attached with the flange 31 of the sleeve 3 against an inner surface of the central recess 110 of the caliper 11. Secondly, hold the sleeve 3 with one hand and rotate the sliding handle 20 of the screw rod 2 with the other hand, by which the sleeve 3 and the first plate body 4 are held tightly so that they can be firmly retained against the inner surface of the caliper 11, and the screw rod 2 is screwed with the threads formed in the inner wall of the passage 30 of the sleeve 3 so that the second plate body 5 is capable of being in a steady location. Therefore, under the rotation of the screw rod 2, the second plate body 5 is moved forwardly to press the piston 14 gradually to its initial position.

Figure 7:
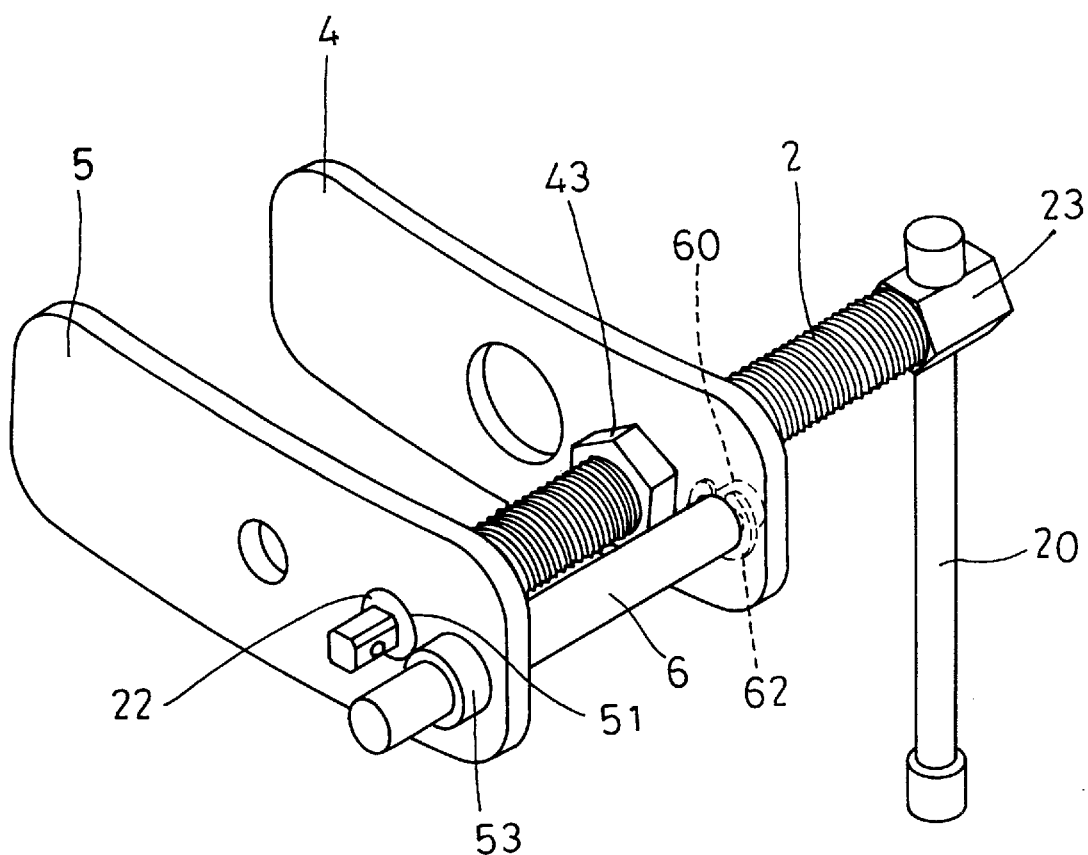
FIG. 7 is a perspective view showing a second preferred embodiment of the tool set for replacing brake pads of disc braking systems in the present invention, showing a second selective combination of the components of the tool set.
Figure 8:
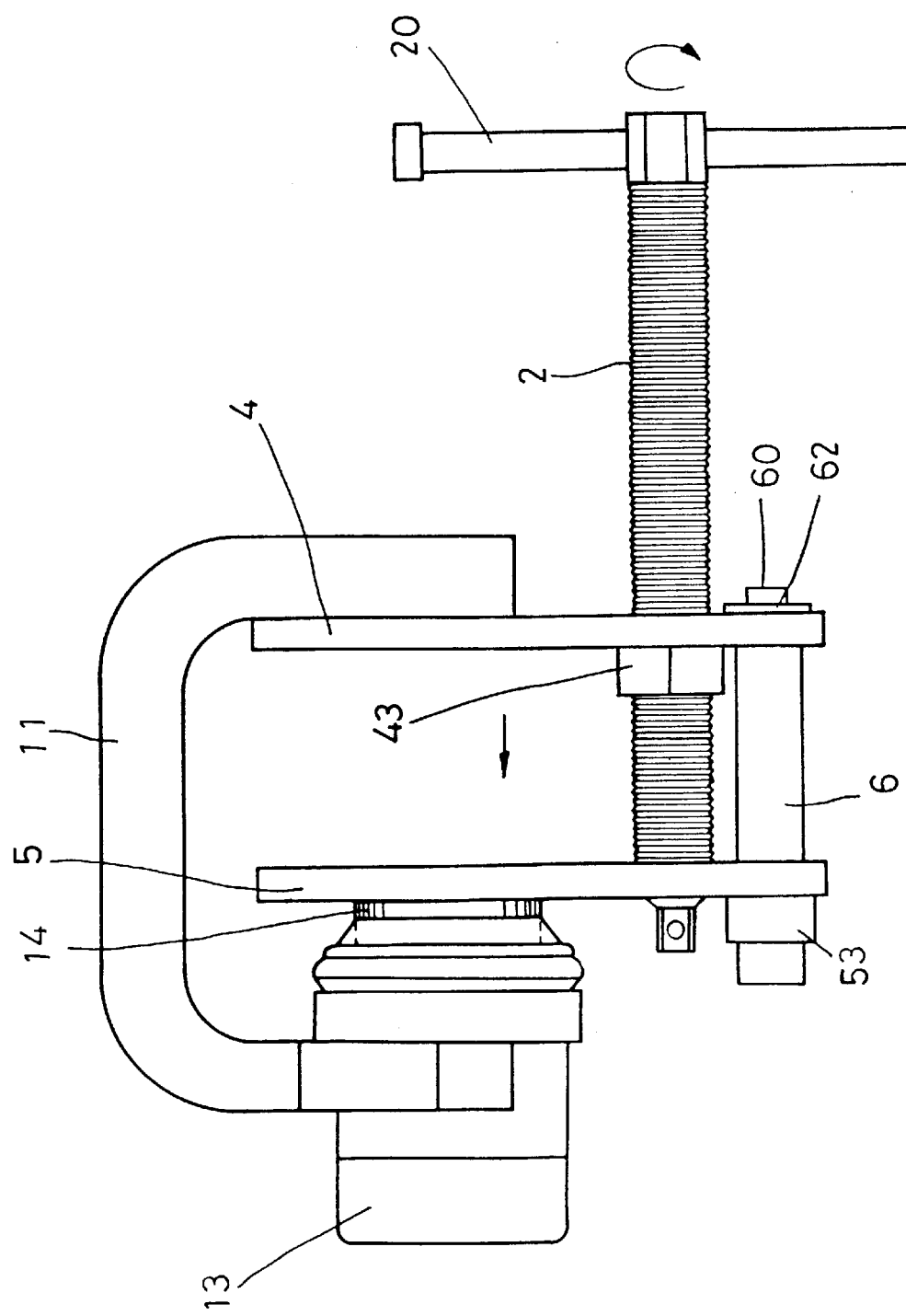
FIG. 8 illustrates from a top view of the caliper, showing the second preferred embodiment of the present invention in operation.

A second preferred embodiment of the tool set for replacing brake pads of disc braking systems in the present invention, as shown in FIGS. 7 and 8, is a second selective combination of components of the tool set used to press a piston 14 that is disposed in a caliper 11 without a central recess 110 to its initial position. In the situation, the screw rod 2 is unable to be aligned with an axis of the piston 14. In assembling, referring to FIG. 7, firstly extend the connecting portion 60 of the guide rod 6 through the small-bore hole 42 of the first plate body 4 and have the ring groove 61 of the guide rod 6 engaged by a retainer ring 62 so that the guide rod 6 is fixed to one side of the first plate body 4. Secondly, screw the screw rod 2 together with the middle-bore screw hole 41 of the first plate body 4 welded with the internal-threaded nut member 43. Thirdly, extend the coupling portion 21 of the screw rod 2 through the second hole 51 formed in the middle position of the second plate body 5 to have the second plate body 5 rested against the tapered plane 22 of the screw rod 2. Fourthly, extend the other end of the guide rod 6 through the third hole 52 welded with the hollow stub pipe 53 and allow the second plate body 5 movable along the guide rod 6, by which a second specialized tool is assembled. In operating, as shown in FIG. 8 illustrating from a top view of the caliper 11, firstly place the sides of the first plate body 4 and the second plate body 5 not screwed by the screw rod 2 respectively in the interior of the caliper 11. Secondly, contact the second plate body 5 with the front surface of the piston 14, by which the screwing of the screw rod 2 with the middle-bore screw hole 41 of the first plate body 4 and the fixing of the guide rod 6 respectively with the sides of the first plate body 4 as well as the second plate body 5 keep the second plate body 5 in a steady location. Therefore, under the rotation of the screw rod 2, the second plate body 5 is moved forwardly to press the piston 14 to its initial position. In disassembling, disengage the retainer ring 62 from the ring groove 61 of the guide rod 6 and draw the guide rod 6 out of the first plate body 4 and the second plate body 5. And then, respectively disconnect the second plate body 5 and the first plate body 4 from the screw rod 2.

Moreover, another way of rapidly combining the connecting portion 60 of the guide rod 6 and the small-bore hole 42 of the first plate body 4 together is to have the connecting portion 60 of the guide rod 6 provided with external threads thereon and the small-bore hole 42 of the first plate body 4 provided with internal threads therein.

Figure 1:
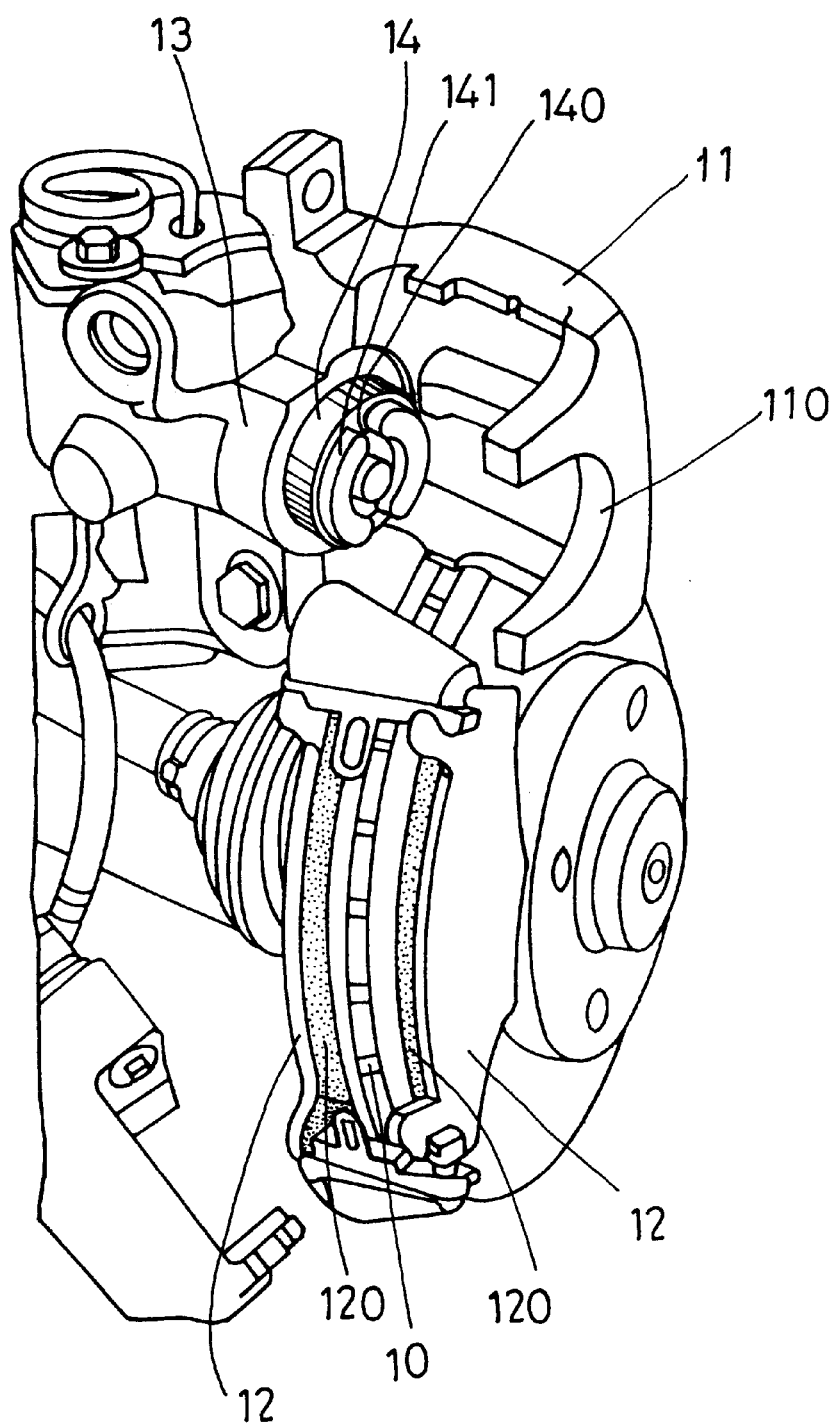
FIG. 1 is a schematic view showing the construction of a disc brake mechanism.
Figure 9:
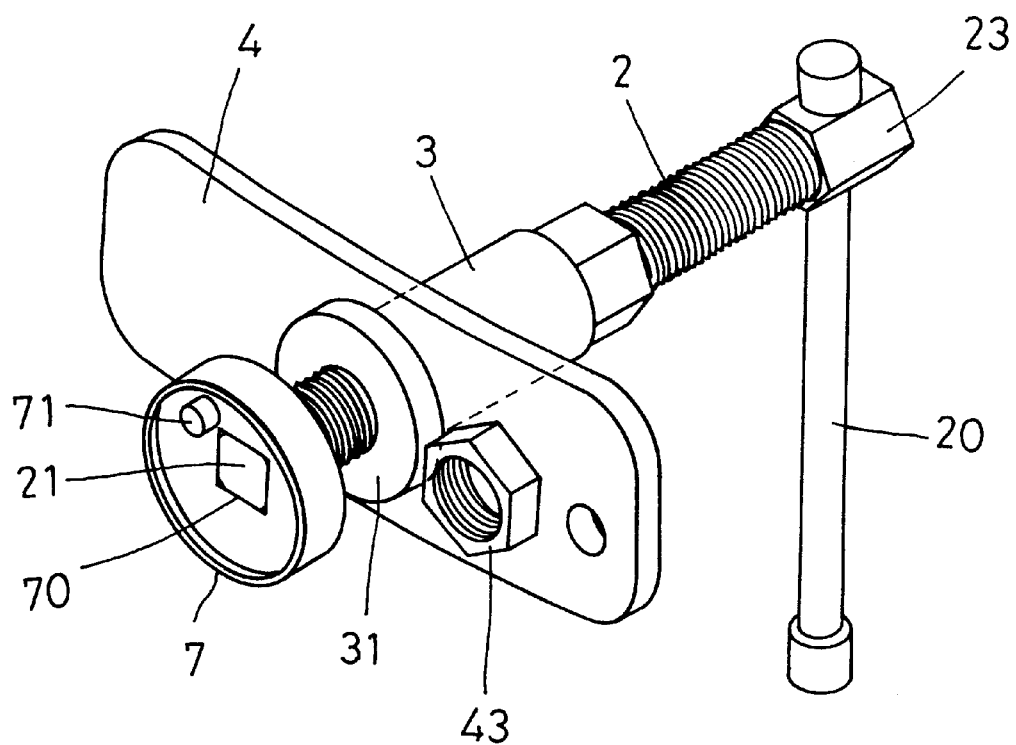
FIG. 9 is a perspective view showing a third preferred embodiment of the tool set for replacing brake pads of disc braking systems in the present invention, showing a third selective combination of the components of the tool set.
Figure 10:
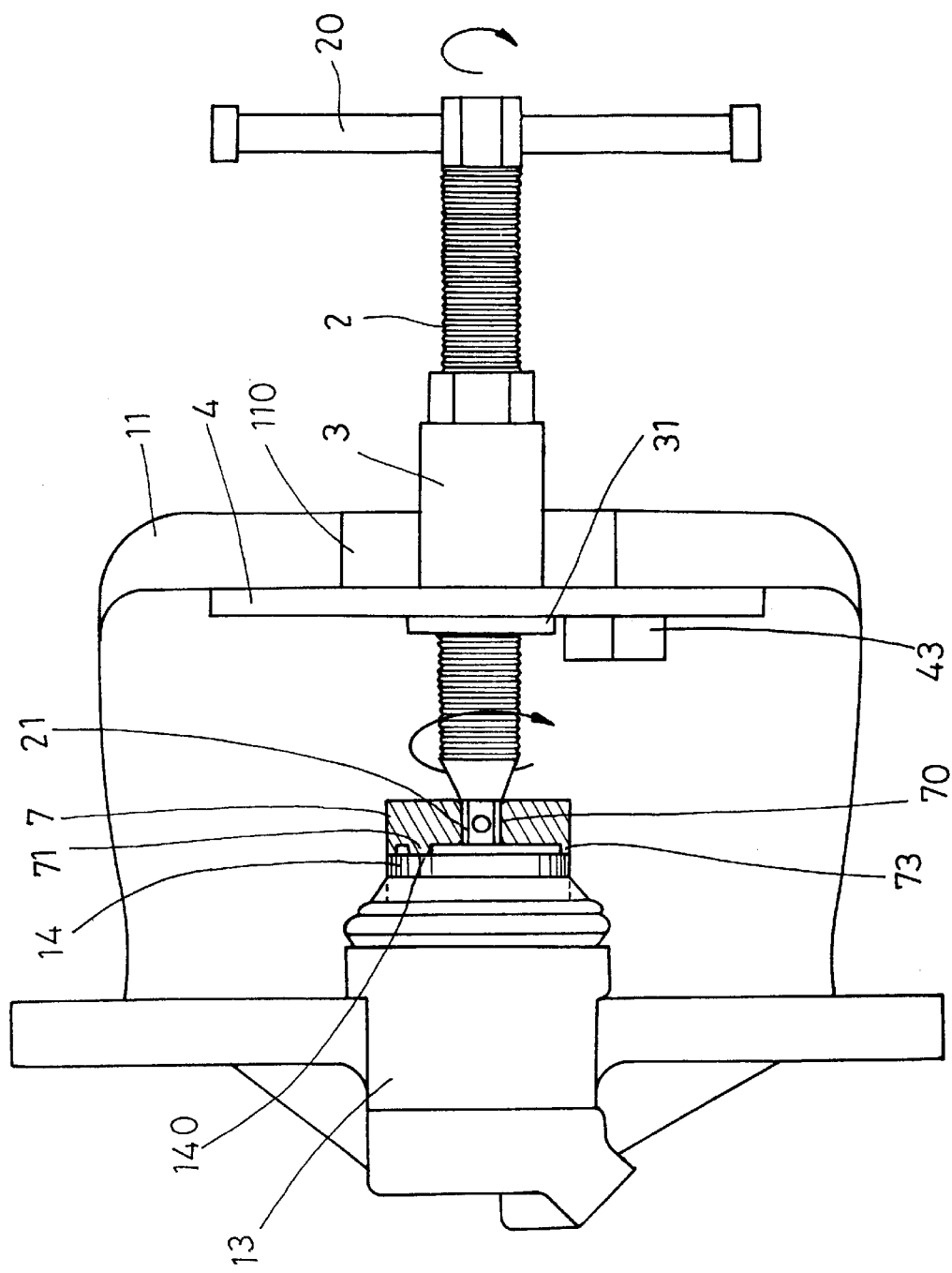
FIG. 10 illustrates from the front view of the caliper, showing the third preferred embodiment of the present invention in operation; and, FIG. 11 is a schematic view of the tool set for replacing brake pads of disc braking systems in the present invention, showing the components of the tool set deposited in a case for convenience of storage and management.

A third preferred embodiment of the tool set for replacing brake pads of disc braking systems in the present invention, as shown in FIGS. 9 and 10, is a third selective combination of components in the tool set used to press a spiral-forward piston 14 that is disposed in a caliper 11 with a central recess 110 to its initial position. In assembling, referring to FIG. 9, firstly extend the rear end of the sleeve 3 through the big-bore hole 40 of the first plate body 4 to have the flange 31 of the sleeve 3 attached against the front surface of the first plate body 4. Secondly, extend the coupling portion 21 of the screw rod 2 through the sleeve 3 from the rear end of the sleeve 3 to have the sleeve 3 screwed with the screw rod 2. Thirdly, choose a suitable connector 7 in accordance with the configuration of the spiral-forward piston 14 and insert the coupling portion 21 of the screw rod 2 into the inert hole 70 formed in the center of the connector 7 in which a wall of the insert hole 70 is tightly urged by a ball 210 disposed on one sidewall of the coupling portion 21, by which a third specialized tool is assembled. In operating, as shown in FIGS. 1 and 10, firstly retain the first plate body 4 against the inner surface of the central recess 110 of the caliper 11. Secondly, join the connector 7 together with the front surface of the spiral-forward piston 14 by engaging the projections 71 of the connector 7 with the engagement grooves 140 because most of the spiral-forward pistons 14 are provided with at least one engagement groove 140. Thirdly, hold the sleeve 3 with one hand and rotate the sliding handle 20 of the screw rod 2 with the other hand. Therefore, under the rotation of the screw rod 2, the connector 7 engaged with the front surface of the spiral-forward piston 14 is rotated to press the spiral-forward piston 14 to its initial position.

Figure 11:
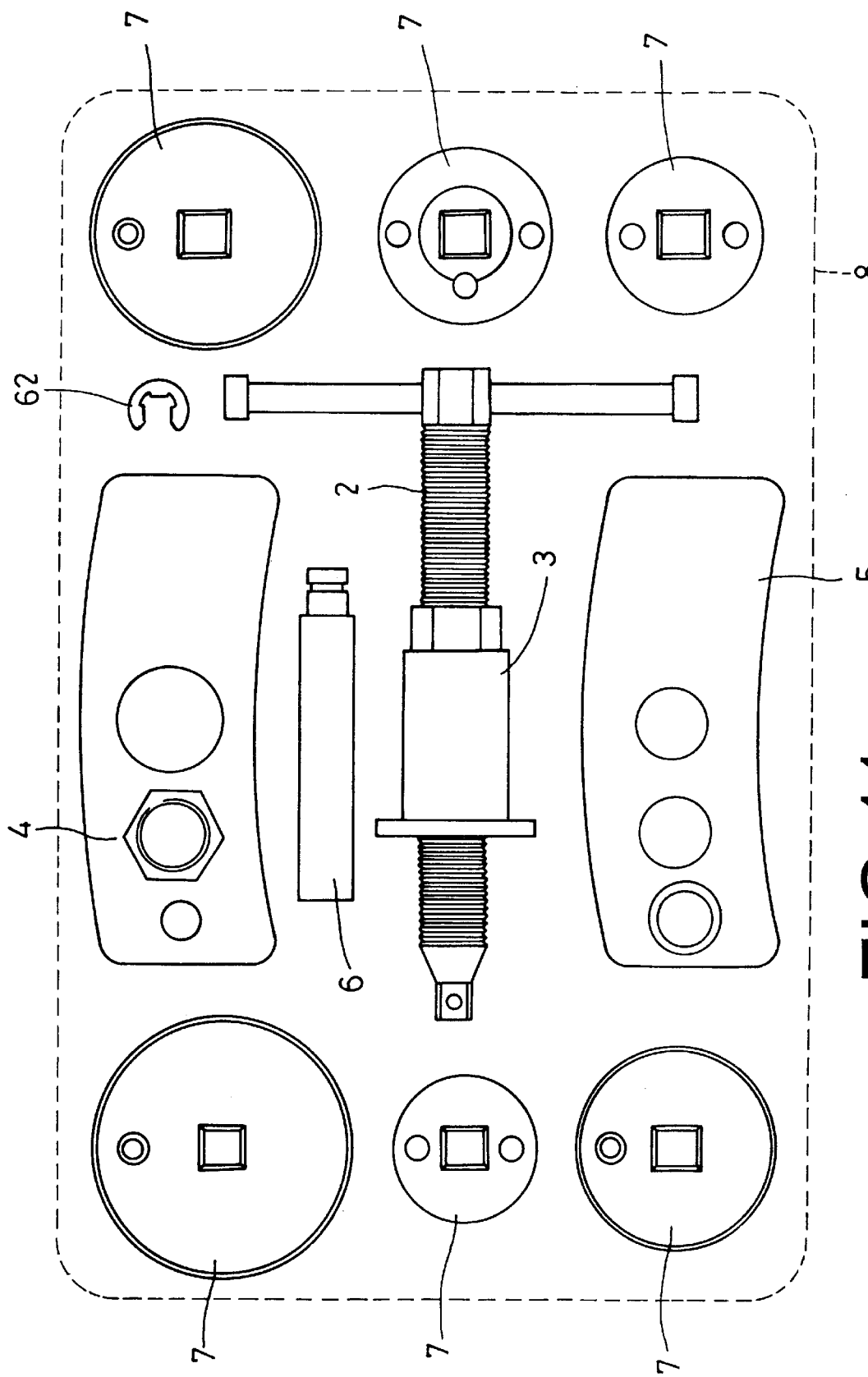

Moreover, as shown in FIG. 11, a case 8 is used to accommodate all the components of the tool set and is convenient for taking out components to make selective combinations of suitable specialized tools and for storage within little space.

The invention has the following advantages and effects, as can be understood from the aforesaid description.

1. The tool set of the present invention is capable of making various selective combinations of the components for automobiles employed with different types of disc braking systems.

2. The tool set is simple in making selective combinations and easy in operation, thereby decreasing combination time and increasing working efficiency.

3. The components of tool set are capable of being placed in only one case, thereby decreasing storage space and being convenient in management.

4. The tool set uses the simplest components to make various selective combinations for different automobiles, thereby greatly decreasing the purchasing cost of the tools.

While the preferred embodiments of the invention have been described above, it will be recognized and understood that various modifications may be made therein and the appended claims are intended to cover all such modifications that may fall within the spirit and scope of the invention.

What is claimed is:

1. A tool set for replacing brake pads of disc braking systems comprising:

a screw rod having one end combined with a sliding handle and the other end provided with a coupling portion as well as a tapered plane;

a sleeve capable of being extended through and screwed by said screw rod and having a hollow threaded passage formed therein as well as a flange formed at one end of said sleeve;

a first plate body capable of being extended through by said screw rod and having a big-bore hole, a middle-bore screw hole and a small-bore hole orderly arranged from a center of said first plate body to one side of said first plate;

a second plate body capable of being extended through by on one end of said screw rod and having a first hole, a second hole as well as a third hole orderly arranged from the center of the second plate body to one side of the second plate body with their centers respectively aligned with those of said big-bore hole, said middle-bore screw hole and said small-bore hole of said first plate body;

a guide rod capable of extending through said small-bore hole of said first plate body as well as said third hole of said second plate body disposed at an outer end of said second plate body, said guide rod having a connecting portion disposed at one end for being fixed to said first plate body;

at least one connector with different sizes each having an insert hole and at least one projection, said insert hole formed in a center of said connector and capable of being extended through by said coupling portion of said screw rod, said at least one projection disposed in a proper position on one surface of said connector for being correspondingly fitted into and engaged with at least one engagement groove located in a front surface of a piston; and, whereby a selective combination of said components described above is capable of providing an automobile with a specialized tool for pressing an outward piston to its initial position for convenient replacing new brake pads when said piston is gradually traveled toward old brake pads with a continuous wearing in linings of said old brake pads; moreover, various selective combinations of said components described above are also capable of providing automobiles employed with different types of disc braking systems with variety of suitable specialized tools fitting functional requirements and being convenient in operation, thereby achieving a high use rate and being convenient for storage.

2. The tool set for replacing brake pads of disk braking systems as claimed in claim 1, wherein said flange of said sleeve is provided with a larger circumferential plane formed at one end of said sleeve for being retained against said big-bore hole of said first plate body.

3. The tool set for replacing brake pads of disc braking systems as claimed in claim 1, wherein said connecting portion of said guide rod is provided with a ring groove for being engaged by a retainer ring so that said connecting portion of said guide rod is capable of being fixed to said first plate body.

4. The tool set for replacing brake pads of disc braking systems as claimed in claim 1, wherein said at least one connector is capable of being provided with said at least one projection on both surfaces for being correspondingly fitted into and engaged with at least one engagement groove located in said front surface of said piston.

5. The tool set for replacing brake pads of disc braking systems as claimed in claim 1, wherein in order to be correspondingly fitted with pistons having various configurations on a front surface, said at least one connector is also provided with a protective lip protruded around the circumference of said at least one connector for being covered on a circumferential edge of said piston.

6. The tool set for replacing brake pads of disc braking systems as claimed in claim 1, wherein in order to be correspondingly fitted with pistons having various configurations on a front surface, said at least one connector is also provided with a raised face disposed in a center of said one surface of said at least one connector.

7. The tool set for replacing brake pads of disc braking systems as claimed in claim 1 or 3, further comprising said small-bore hole of said first plate body is provided with internal threads therein and said connecting portion of said guide rod is provided with external threads thereon so that said small-bore hole of said first plate body and said connecting portion of said guide rod can be screwed together accordingly.

8. The tool set for replacing brake pads of disc braking systems as claimed in claim 1, wherein an internal-threaded nut member with reinforcing function is capable of being firmly welded on one side of said middle-bore screw hole of said first plate body; a hollow stub pipe with reinforcing function is capable of being firmly welded on one side of said third hole of said second plate body as an outstretched portion of said third hole of said second plate body and communicated with said third hole of said second plate body.

* * * * *